United States Patent [19]

Moritz

[11] 4,420,017
[45] Dec. 13, 1983

[54] ENERGY CONDUIT SUPPORT

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 260,666

[22] Filed: May 4, 1981

[30] Foreign Application Priority Data

Oct. 24, 1980 [DE] Fed. Rep. of Germany ....... 3040076

[51] Int. Cl.$^3$ ............................................. F16L 11/18
[52] U.S. Cl. ..................................... 138/120; 19/126; 285/163
[58] Field of Search ............... 138/118, 120, 157, 161, 138/162, 163, 155, 156, 159, 108, 110, 116, 117; 137/615; 285/163, 164, 114, 181, 223, 224; 191/12 R, 12 C; 59/78.1; 174/69, 86; 464/182

[56]  References Cited
U.S. PATENT DOCUMENTS

| 1,255,577 | 2/1918 | Berry | 285/163 X |
| 2,643,680 | 6/1953 | Kaiser | 285/181 X |
| 3,330,105 | 7/1967 | Weber | 191/12 C |
| 4,111,236 | 9/1978 | Moritz | 285/163 |
| 4,228,825 | 10/1980 | Moritz et al. | 285/163 |

Primary Examiner—Stephen Marcus
Attorney, Agent, or Firm—Martin A. Farber

[57] ABSTRACT

An energy conduit support between a movable consumer and a stationary connection comprising narrow tubular members with outwardly directed outer abutment stops and wide tubular members with inwardly directed abutment stops which interengage, respectively, and can be bent at an angle only in one direction relative to one another, the narrow tubular members having in their central plane a circumferential central abutment stop ring forming grooves on both sides thereof towards the outer abutment stops for the engagement of the stops on the wide tubular members, the wide tubular members being shortened on each side in the vicinity of a longitudinal cross-sectional half by approximately the width of one groove and each comprising two tubular member halves which can be placed over the narrow tubular members. The central stop ring of the narrow tubular members is formed with parallel flanks in the vicinity of the wide tubular member halves and with flanks which extend apart being inclined towards the neutral axis on both arms in the vicinity of the narrow tubular member halves, and the outer abutment stops of the narrow tubular members have flanks which in the vicinity of the wide tubular member halves taper being inclined towards the central stop ring on both arms from the outside to the inside towards the neutral axis and flanks which extend parallel to each other in the vicinity of the narrow tubular member halves.

13 Claims, 11 Drawing Figures

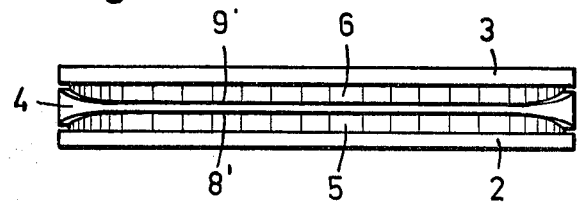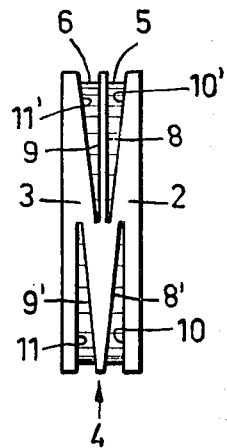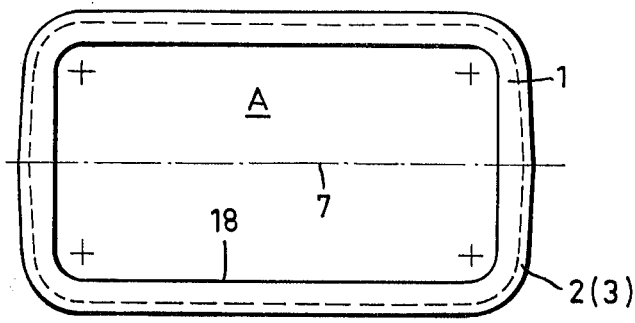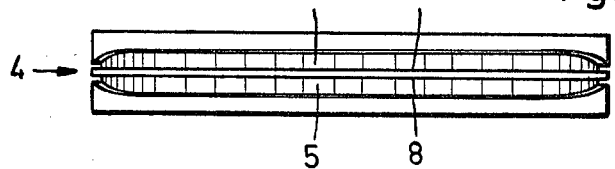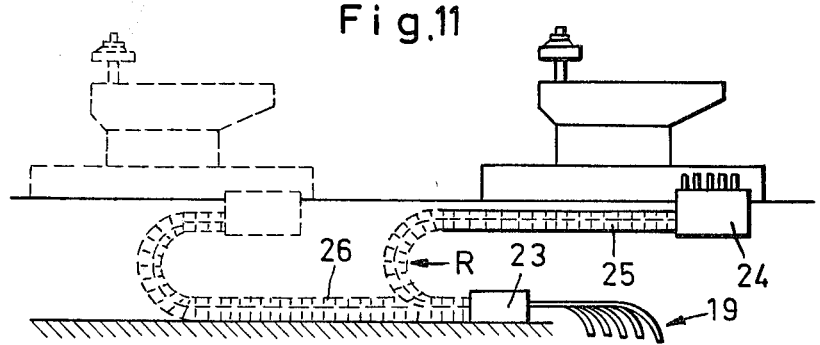

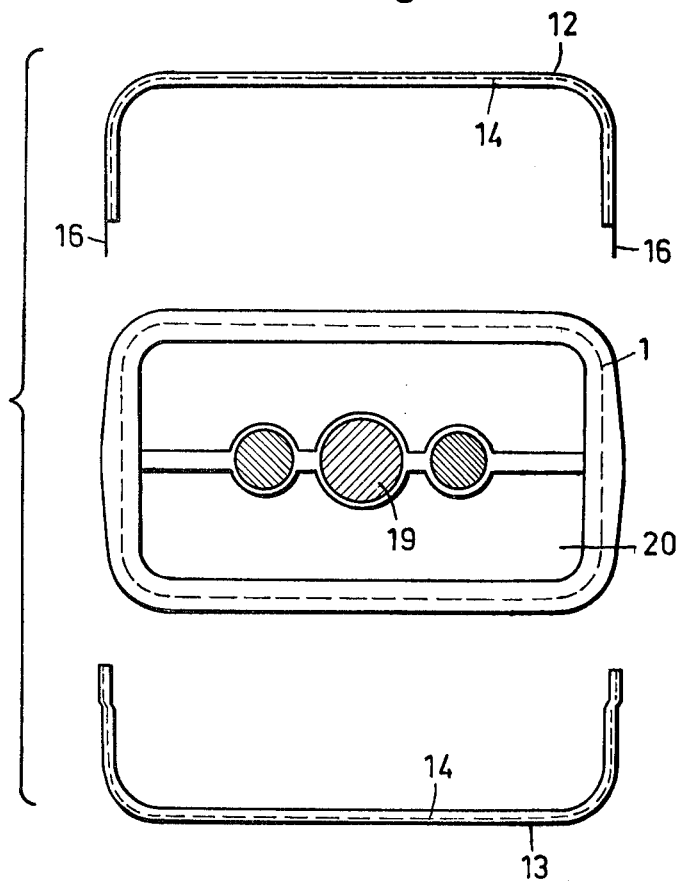
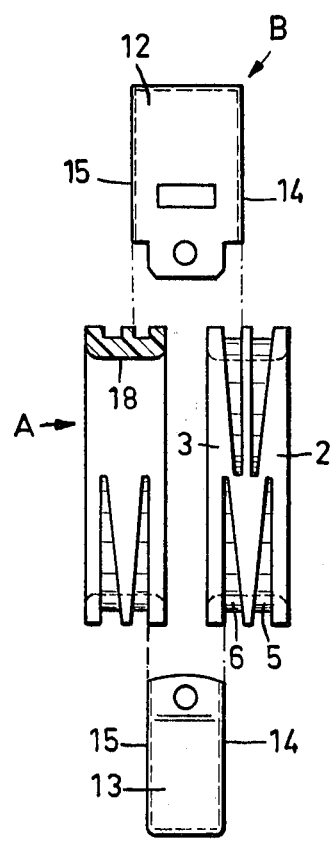
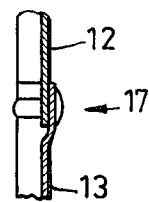
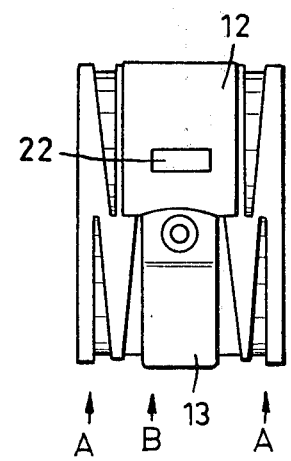

ENERGY CONDUIT SUPPORT

The present invention relates to an energy conduit support for arrangement between a movable load-consuming device and a stationary connection, consisting of narrow tubular members with outward directed stops and wide tubular members with inward directed stops which engage behind each other and can be bent at an angel to each other only in one direction, the narrow tubular members having in their central plane a circumferential stop ring on both sides of which grooves are formed towards the outer stops for the engagement of the stops on the wide tubular members, and the wide tubular members being shortened approximately by the width of one groove on each side in the region of a cross section half and being formed of two tubular member halves which can be placed over the narrow tubular members.

From West German Auslegeschrift AS No. 28 05 832 (U.S.A. Pat. No. 4,228,825) and West German Offenlegungsschrift OS No. 28 53 715 an energy conduit support of the above-described type is known. In that energy conduit support the narrow tubular members are provided in their central plane with a circumferential stop ring and are developed symmetrically while the wide tubular members are shortened by the width of one groove on both sides as seen in the longitudinal direction of the energy conduit support so that the energy conduit support can be curved to only in one direction out of its flattened position. In the flattened position the stops of the wide tubular members rest (above the central plane formed by the neutral axis) against the circumferential stop ring and below this central plane against the outer stops of the narrow tubular members, over their entire length, since in this flattened position the stops extend parallel to each other on the narrow and wide tubular members. In the curved end position, on the other hand, the stops of the wide tubular members rest (above the central plane formed by the neutral axis) against the outer stops of the narrow tubular members only in their central region that is, the top between the lateral arms and below said plane on the opposite side only rest in the central region that is the bottom between the lateral arms against the circumferential stop ring of the narrow tubular member since in this curved position the stops on the facing lateral arms of the energy conduit support extend at an acute angle to each other. Accordingly the load-bearing capacity of the energy conduit support is diminished in the region of curvature, which region is precisely the one loaded most strongly by the weight of the upper flattened course since the flexural forces which occur have to be transmitted solely by the relatively narrow regions of overlap between the stops in the central region at the top and bottom.

From this, the object of the present invention is to provide an energy conduit support of the above-described type which has improved load-carrying capacity and in which the neutral axis lies in the center and the stops of the wide tubular members even in the curved end position come to rest against the stops or the stop ring of the narrow tubular members.

In accordance, with the present invention the central stop ring of the narrow pipe members is provided in the region of the wide tubular member halves with parallel flanks and in the region of the narrow tubular-member halves on both arms with flanks which extend apart inclined towards the neutral axis, and that the outer stops of the narrow tubular members in the region of the wide tubular member halves at both arms have flanks which extend, inclined, from the top to the center towards the neutral axis narrowing towards the central stop ring and in the region of the narrow tubular-member halves have flanks which extend parallel to each other.

In one practical embodiment it has been found advisable to make the width of the grooves on the narrow tubular members on each side of the central stop ring directly above and below the neutral axis only just as large as corresponds to the thickness of the material of the wide tubular members, i.e. the edge thickness of the stops 14 or 15. Should it prove necessary to change the radius of curvature of the energy conduit support of a given size then this can be done by changing the width of the outer stops in the region of the wide tubular member halves and of the stop ring in the region of the narrow tubular-member halves on the narrow tubular members.

An energy conduit support developed in accordance with the invention has the advantage that the stops of the wide tubular members, which include curved corners, even in the curved end position abut over their entire length against the outer stops and the central stop ring of the narrow tubular members. In this way the forces to be transmitted by the narrow overlap regions of the stops at the narrow and wide tubular members are distributed over a larger and stronger (as a result of the corners) surface, respectively, and a bending open of the bent edges of the wide tubular members, particularly in the arcuate parts of the tubular-member halves, is made difficult. An energy conduit support developed in accordance with the invention is therefore able to take up greater weights without the tubular members in the region of curvature breaking apart or bending.

Further details and advantages of the object of the invention will become evident from the following description of the corresponding drawings in which one preferred embodiment of the energy conduit support has been diagrammatically shown. In the drawings:

FIG. 3 shows a narrow tubular member in plan view;

FIG. 4 shows the same tubular member in bottom view;

FIG. 5 shows the same tubular member in top view;

FIG. 6 shows the same tubular member in side view;

FIG. 7 is an exploded view of two narrow tubular members and a still separated wide tubular member in plan view;

FIG. 8 shows the same exploded view of FIG. 7 in side view;

FIG. 9 shows two narrow tubular members connected with each other by a wide tubular member, seen in side view;

FIG. 10 shows a connection for the two tubular-member halves of the wide pipe members using an expansion rivet shown in cross section; and FIG. 11 shows a functional diagram for a self-supporting energy conduit support between a movable load-consuming device and a fixed connection.

Figure 1:
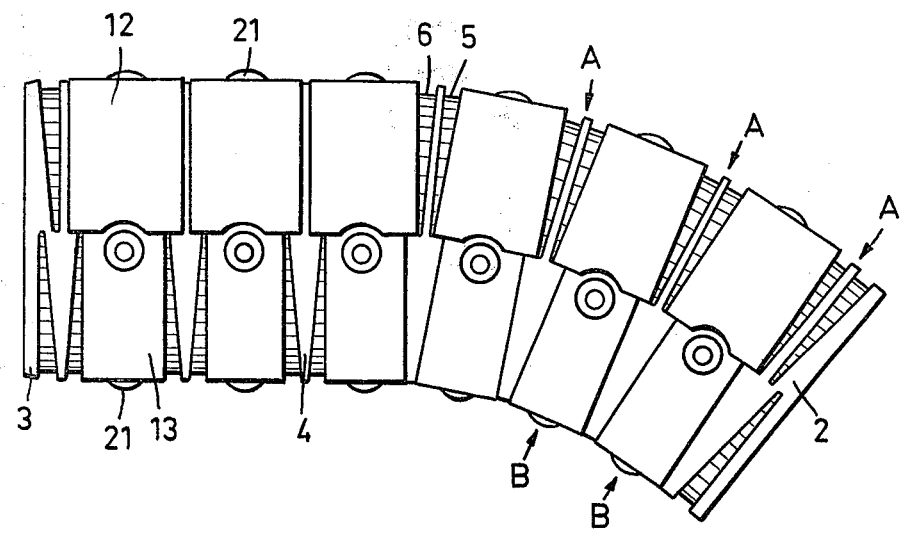
FIG. 1 shows several interconnected pipe members of an energy conduit support, seen in side view.

An energy conduit support developed in accordance with the invention comprises of an alternate sequence of narrow pipe members A and wide pipe members B which are inserted into each other in form-locked manner i.e. the form of the parts cooperating in an interlocking manner and in the flattened position i.e. flat or straight can be swung mutually relative to each other only towards one side while they form a rigid self-supporting tubular line in the flattened position.

Each narrow tubular member A in the embodiment shown comprises a ring 1 of rectangular cross section which at the outer periphery forms two grooves 5 and 6 limited by outwardly directed outer abutment stops 2, 3 and by a central circumferential abutment stop ring 4. Above and below a central plane defined by the (neutral axis 7,) the two grooves 5 and 6 on the top (FIG. 5) and bottom (FIG. 4) are of the same width, but on the lateral arms of the narrow tubular member A they are inclined tapering towards each other. In the upper half, the central stop ring 4 is of narrow formation and has flanks 8 and 9 extending parallel to each other. In the lower half, the central stop ring 4 on the other hand is narrow has flanks 8' and 9'0 which extend parallel to each other only in the bottom central region (FIG. 5), while on the lateral arms (FIG. 6) these flanks 8', 9' are inclined extending apart from the bottom to the center towards the neutral axis 7. The outer stops 2 and 3 on the other hand on the lateral arms are provided in the lower half with flanks 10 and 11 which extend parallel to each other while in the upper half the flanks 10' and 11' are inclined extending together from the top to the center towards the central stop 4 and the neutral axis 7. By this difference in the development of the course of the flanks 8 to 11 on the outer stops 2, 3 and on the central stop ring 4 of the narrow tubular members A on both upper and lower sides of the neutral axis 7 there are obtained different shapes, the importance of which will be described below in connection with the shaping of the wide tubular members B.

Each wide tubular member B in the embodiment shown, comprises tubular-member halves 12 and 13 of U shape. The upper tubular-member half 12 is wider by an amount equal to the width of the two grooves 5 and 6 than the lower pipe-member half 13. Due to this the lower tubular member half 13 is spaced inward on each side by an amount equal to the width of a groove 5, 6 in the region of the neutral axis 7. At their edges the two tubular-member halves 12 and 13 have inwardly directed stops 14 and 15 which engage into the grooves 5 and 6 on the narrow tubular members A.

On each arm of an outer tubular-member half 12 there is provided an extension 16 over which in inserted condition, the ends of the arms of the other tubular member half 13 extend. The connection between the two tubular member halves 12 and 13 is effected by an expansion rivet 17 in the overlap region.

Figure 2:
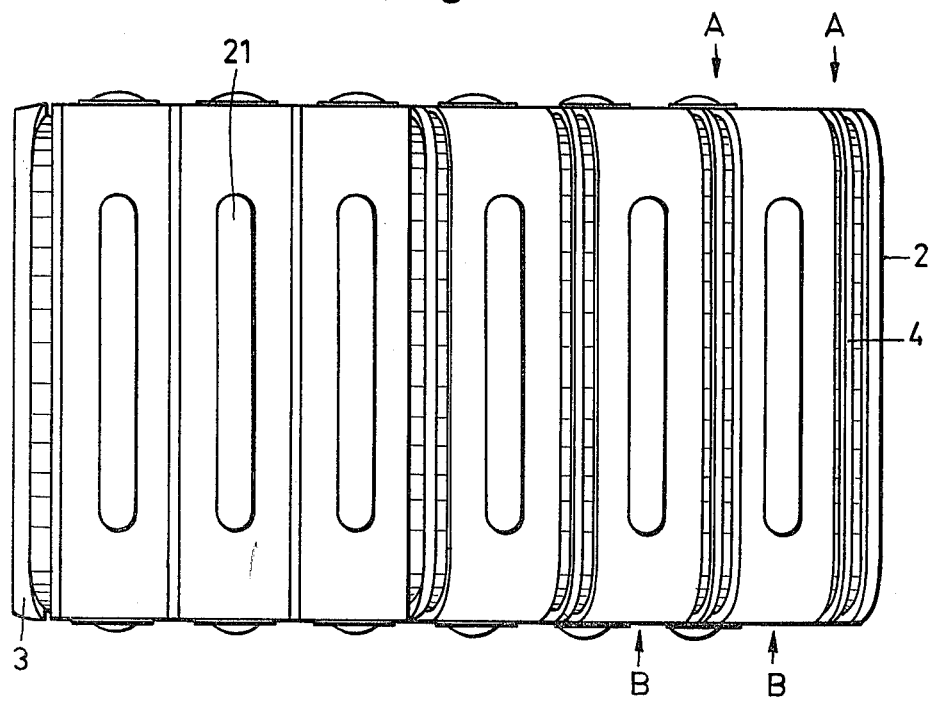
FIG. 2 shows the same tubular members in top view.

In assembled condition the narrow tubular members A and the wide tubular members B can be swung towards each other by an amount equal to the width of a groove 5 or 6. In this connection the stops 14 and 15 of the wide-tubular members B place themselves in the flattened position shown in the left-hand half of FIGS. 1 and 2 above the neutral axis 7 against the flanks 8, 9 of the stop ring 4 which extend parallel to each other while below the neutral axis 7 they rest against the flanks 10 and 11 (which are parallel to each other) of the stops 2 and 3. In the curved position shown in the right-hand half of FIGS. 1 and 2, on the other hand the stops 14 and 15 of the wide-tubular members B place themselves, above the neutral axis 7, against the inclined extending flanks 10' and 11' of the stops 2 and 3 while below the neutral axis 7 they rest against the inclined extending flanks 8' and 9' of the stop ring 4. The inclined course of the two grooves 5 and 6 at the two sides of the grooves 5 and 6 of the narrow tubular member A and their different development above and below the neutral axis 7 therefore have the result that the stops 14 and 15 of the wide tubular members abut over their entire length including their rounded corner portions (FIG. 7) in the end positions against the stops 2, 3 and the stop ring 4 of the narrow pipe members A respectively.

The narrow tubular members A preferably are made of an insulating material, particularly plastic, so that they have a smooth and protecting covering 18 for energy conduits 19 on their inside. However, it is also possible to develop inward extending holders 20 on the ring 1 of each narrow tubular member A in order to hold the energy conduits 19 in the neutral axis 7 which is neutral upon a swinging motion, i.e., the length does not change here.

The wide tubular members B are suitably punched and embossed from a thin metal sheet. In this connection it is possible to emboss outward protruding beads 21 in the center of the tubular member halves which beads on the one hand increase the dimensional stability and on the other hand serve as resting surface for the energy conduit support when it is used in accordance with its purpose. Furthermore, it is possible to stamp openings 22 for ventilation of the interior into the arms of the tubular-member halves 12 and 13 so that no heat build-up can take place.

An energy conduit support constructed and assembled in accordance with the foregoing is intended to be used between a fixed connection 23 and a movable load-consumer 24, for instance the carriage of a machine tool in order to guide the energy conduits 19 and particularly cable and tubes for electricity, compressed air and/or coolant, in a gentle stress-relieved manner. In this connection the energy conduit support must be self-supporting in its upper course so that it does not sag and the energy conduits 19 do not buckle. Towards its lower side 26 the energy conduit support should be curved only by a radius R which corresponds to the permissible radius of flexure of the most sensitive energy conduit 19. These conditions for a self-supporting construction of the energy conduit support, the maintaining of a given radius of curvature as well as the protective stress-relieved guidance of the energy conduits 19 are satisfied by the shaping of the narrow tubular members A and the wide tubular members B in accordance with the present claims. The load taken up by the wide and narrow tubular members of the device of the present invention is also transferred through the rounded corner portions of such members and not merely via the horizontal and substantially vertical edges. The corners of the wide and narrow tubular members, constituting the transition between the horizontal abutment edges and the vertical abutment edges, form rounded abutting edges providing good strength for the sheet metal inwardly directed abutment stops 14, 15.

While I have disclosed one embodiment of my invention it is to be understood that this embodiment is given by example only and not in a limiting sense.

I claim:

1. In an energy conduit support between a movable consumer and a stationary connection comprising narrow tubular members with outwardly directed outer abutment stops and wide tubular members with inwardly directed abutment stops which engage behind each other, respectively, said members can be bent at an angle only in one direction with respect to one another, said members having top and bottom central regions and two arms therebetween, the narrow tubular members respectively having in a transverse central plane thereof a central outwardly directed abutment stop ring defining grooves, respectively, on both sides thereof towards the outer abutment stops and adapted for engagement of the inwardly directed abutment stops on the wide tubular members, the wide tubular members each being shortened in a longitudinal direction of the support on both sides, respectively, in the vicinity of a longitudinal cross-sectional half of the support by approximately the width of one of the grooves, respectively, and comprising two tubular member halves which can be placed over the narrow tubular members, said two tubular member halves constituting a wide tubular member half substantially above an axial neutral axis of the conduit support and a narrow tubular member half substantially below the neutral axis, the improvement wherein the central outwardly directed abutment stop ring of each of the narrow tubular members has:
parallel flanks in a vicinity of the wide tubular member halves, and
diverging flanks which extend apart in a direction towards the neutral axis on both arms in the vicinity of the narrow tubular member halves,
the outer abutment stops of each of the narrow tubular members have facing:
converging flanks on both arms in the vicinity of the wide tubular member halves, said converging flanks taper towards the central outwardly directed abutment stop ring in a direction towards the neutral axis, and parallel flanks in the vicinity of the narrow tubular member halves.

2. The energy conduit support according to claim 1, wherein
the width of each of the grooves at ends thereof adjacent the neutral axis substantially corresponds to the thickness of the inwardly directed abutment stops, respectively, of the wide tubular members.

3. The energy conduit support according to claims 1 or 2, wherein
said support has a radius of curvature of said wide and narrow tubular members in combination said radius of curvature is a variable function of the width of the outer abutment stops in the vicinity of the wide tubular member halves and of the abutment stop ring in the vicinity of the narrow tubular member halves.

4. The energy conduit support according to claim 2, wherein
said adjacent ends are above and below said neutral axis, respectively.

5. The energy conduit support according to claim 1, wherein
said diverging flanks are parallel to said converging flanks, respectively, but inclined relative to said parallel flanks.

6. The energy conduit support according to claim 1, wherein
said diverging flanks extend apart inclined and said converging flanks taper inclined.

7. The energy conduit support according to claim 1, 5, or 6, wherein
adjacent of said diverging flanks and said converging flanks, at respective opposite sides of the transverse central plane are spaced apart substantially corresponding to the shortening of said wide tubular members on each of said both sides, respectively.

8. The energy conduit support according to claim 5, wherein
said inwardly directed abutment stops of said wide tubular members having outwardly facing parallel flanks facing said flanks of said stop ring.

9. The energy conduit support according to claim 8, wherein
said outwardly facing parallel flanks of each of said wide tubular members are stepped offset relative to each other and parallel to a transverse central plane through said wide tubular members.

10. The energy conduit support according to claim 1, wherein
said abutment stops of said wide tubular members have outwardly facing flanks forming surfaces corresponding to that of said flanks of said abutment stop ring adjacent thereto, respectively, and inwardly facing facing flanks forming surfaces corresponding to that of said flanks of said outer abutment stops of said narrow tubular members,
respective of said surfaces along their entire lengths engaging in respective abutment end positions when respective of said members are bent at said angle in said one direction with respect to each other and when said members are aligned flat relative to each other, respectively.

11. The energy conduit support according to claim 10, wherein
the inwardly directed abutment stops of the wide tubular members have rounded corners engageable with the abutment stops of said narrow tubular members when said members are bent at said angle with respect to one another.

12. The energy conduit support according to claim 11, wherein
said wide tubular members with the inwardly directed abutment stops are made of sheet metal.

13. The energy conduit support according to claim 1, wherein
all of said flanks are parallel in said top and bottom central regions.

* * * * *